United States Patent [19]

Zuber

[11] Patent Number: 4,556,941

[45] Date of Patent: Dec. 3, 1985

[54] TRANSIT VEHICLE SPEED MAINTAINING CONTROL APPARATUS AND METHOD

[75] Inventor: Pierre A. M. Zuber, Baldwin, Pa.

[73] Assignee: Westinghouse Electric Corp., Pittsburgh, Pa.

[21] Appl. No.: 483,795

[22] Filed: Apr. 11, 1983

[51] Int. Cl.$^4$ ............................................. B61L 3/18
[52] U.S. Cl. .................. 364/426; 246/182 B; 246/182 C; 246/182 R; 364/436
[58] Field of Search ............... 364/424, 426, 436, 565; 246/182 B, 182 C, 182 R, 187 B; 324/160, 161

[56] References Cited

U.S. PATENT DOCUMENTS

| | | | |
|---|---|---|---|
| 3,638,575 | 2/1972 | Griner | 246/182 B |
| 4,217,643 | 8/1980 | Anderson | 364/426 |
| 4,234,922 | 11/1980 | Wilde et al. | 364/426 |
| 4,270,716 | 6/1981 | Anderson | 364/426 |
| 4,374,422 | 2/1983 | O'Keefe et al. | 364/426 |
| 4,402,047 | 8/1983 | Newton et al. | 364/426 |
| 4,410,154 | 10/1983 | Matty | 364/426 |

*Primary Examiner*—Errol A. Krass
*Assistant Examiner*—Thomas G. Black
*Attorney, Agent, or Firm*—R. G. Brodahl

[57] ABSTRACT

There is disclosed a speed control apparatus and method for a passenger vehicle moving along a track in response to an input command speed, which produces fewer operative changes between the brake mode and the power mode for an improved speed maintaining control of the vehicle.

10 Claims, 11 Drawing Figures

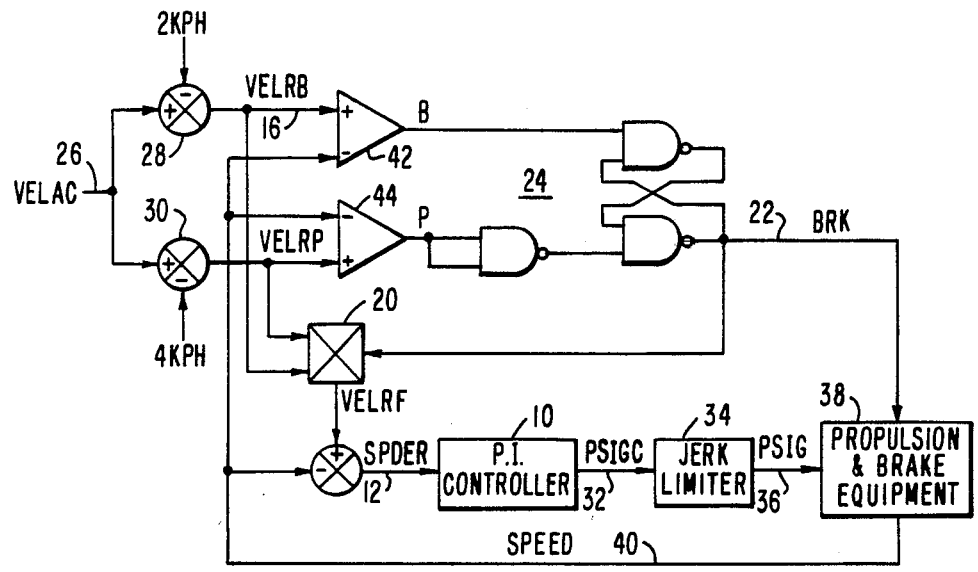
PRIOR ART
FIG. 1
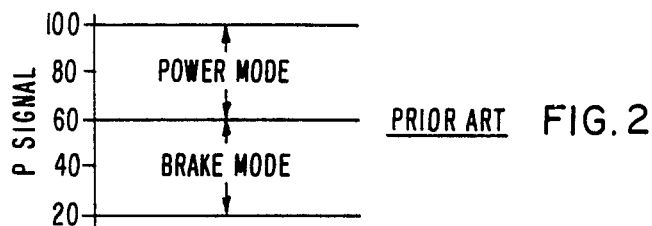
PRIOR ART  FIG. 2
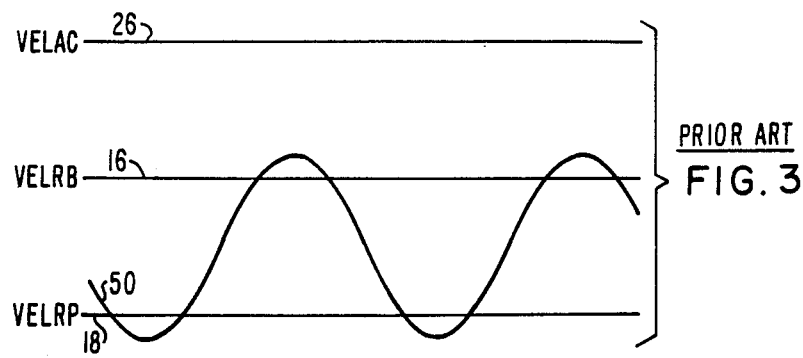
PRIOR ART
FIG. 3

TRANSIT VEHICLE SPEED MAINTAINING CONTROL APPARATUS AND METHOD

BACKGROUND OF THE INVENTION

It is known to automatically control with a programmed microprocessor the speed of a passenger vehicle, such as a mass transit vehicle, while the vehicle is moving along a roadway track. A prior art passenger vehicle control apparatus and method, including hardware and software, to control the speed of such a vehicle in response to a P signal effort request is disclosed in U.S. Pat. No. 4,217,643 to L. W. Anderson et al, the disclosure of which is incorporated herein by reference.

A general description of microprocessor operation and related peripheral devices, including the INTEL 8080 Microprocessor, is provided in the INTEL Component Data Catalog currently available from INTEL Corporation, Santa Clara, Calif. 95051.

SUMMARY OF THE INVENTION

A passenger vehicle speed control apparatus and method responsive to a desired command speed provides a delayed switching of the speed control operation from the brake mode to the lower mode in response to the effort control signal and to result in a reduction in the operative mode changes and to provide a more stable speed maintaining control of the vehicle in relation to various track grade changes, and particularly in relation to a downhill grade of the roadway track.

BRIEF DESCRIPTION OF THE DRAWINGS

FIG. 1 is a functional schematic of a prior art speed maintaining control system;

FIG. 2 shows the value of the effort request P signal in relation to power mode and brake mode operation of the prior art speed control apparatus;

FIG. 3 is a curve illustrating a typical prior art speed control operation including brake mode to power mode to brake mode control changes for a transit vehicle;

DESCRIPTION OF A PREFERRED EMBODIMENT

Figure 4:
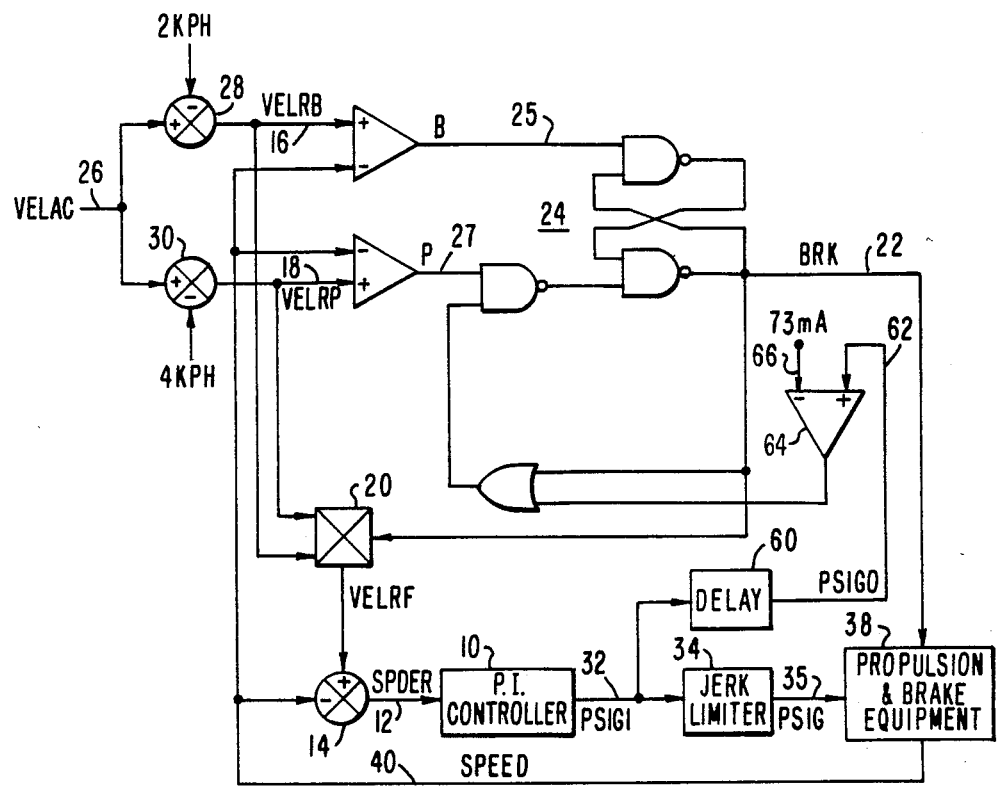
FIG. 4 is a functional schematic of the brake mode and power mode vehicle speed control system of the present invention.

In FIG. 1 there is provided a functional schematic of a prior art speed maintaining control apparatus, including a proportional and integral controller 10 which responds to a speed error signal 12 from a comparator 14 responsive to one of a brake reference velocity signal 16 or a power reference velocity signal 18 through operation of a selector 20 that responds to the brake mode or the power mode control signal from output 22 of a power brake controller 24. An input action velocity or command speed control signal 26 is supplied to a first comparator 28, which provides the brake reference velocity signal 16 as 2 KPH below the value of the action velocity signal 26 and is operative with a comparator 30 which provides the power reference velocity signal 18 as 4 KPH below the action velocity signal 26.

The PI controller 10 provides an output first effort request P signal 32 to a jerk limiter 34 which provides an output second effort request P signal 36 to the propulsion and brake equipment 38 of a transit vehicle. The output signal 22 from the power brake controller 24 is either a brake mode control signal having a zero value or a power mode control signal having a one value. The actual speed 40 of the vehicle is fed back as an input to the power brake controller 24. When the actual speed 40 is above the brake reference velocity VELRB signal 16, the comparator 42 provides an output to cause the power brake controller 24 to provide the brake mode control signal to the propulsion and brake equipment 38. When the actual speed signal 40 is less than the power reference velocity VELRP signal 18, the comparator 44 provides an output signal 22 to the power brake controller 24 such that the power mode control signal is supplied to the propulsion and brake equipment 38.

In the typical speed maintaining control operation of a transit vehicle, particularly while the vehicle is going down a roadway track grade and with a prior art speed control apparatus, the speed control will respond to an increase in the vehicle speed 40 above the brake reference velocity 16 to provide a brake mode of operation and the difference between the brake reference velocity and the vehicle speed will determine the P signal 36 during this brake mode operation. Then the speed control will respond to the decrease in the vehicle speed below the power reference velocity 18 to provide the power mode of operation and the difference between the power reference velocity and the vehicle speed 40 will determine the P signal during this power mode operation. The speed maintaining control operation will oscillate back and forth in this manner between the brake mode and the power mode as the transit vehicles moves along the roadway track.

The desired vehicle speed profiles for the roadway track is determined by speed code information provided to the respective track circuits in the form of command speed codes. The speed maintaining control apparatus including a PI controller performs the vehicle speed maintaining function in response to a track circuit command speed to determine a power mode and a brake mode of operation within that track circuit. The characteristics of the power and brake controller output signal 22 are such that if this signal is a logic one this permits the train vehicle to be in the power mode and if this signal is a logic zero the train vehicle is in the brake mode.

The P signal as shown in FIG. 2 has a mid scale range of 60 milliamps, when the train vehicle essentially coasts with this 60 milliamp signal being provided. When the P signal value is from 60 up to 100 milliamps, this is the normal power mode range, and from 60 down to 20 milliamps is the normal brake mode range. A P signal of 20 milliamps would call for full service brakes, and a P signal of 100 milliamps would call for maximum acceleration. The P signal and the brake controller output signal from the power and brake controller are put on train lines and go to each car vehicle in a multiple car vehicle train. The P signal and the brake controller output signal go to the propulsion and brake equipment 38 on each car, which then converts these signals into motor current and brake pressure. The vehicle motors and the vehicle brakes control the actual train velocity. The train velocity is sensed by tachometers physically mounted on the motor axles, and which provide the actual speed feedback signal 40. The function of the speed maintaining apparatus shown in FIG. 1 is to first determine the desired speed of the vehicle in accordance with the input command speed signal, and then to control the vehicle speed through the P signal 36 and the brake control signal 22 such that the tachometer feedback 40 agrees with the desired input command speed 26.

In FIG. 3 there is shown a curve illustrating the typical prior art speed maintaining control operation for a transit vehicle. The input command speed VELAC, which is signal 26 in FIG. 1, is the desired action velocity for the vehicle moving down the roadway track. The brake reference velocity VELRB, which is the signal 16 shown in FIG. 1, is in the order of 2 KPH below the input command speed 26. The power reference velocity VELRP, which is the signal 18 shown in FIG. 1, is in the order of 4 KPH below the input command speed 26. The typical operation of the prior art speed control apparatus is shown by the curve 50 corresponding to the actual speed of the vehicle, where the speed goes below the power reference velocity 18 such that the power mode is provided and the P signal is increased in value in an effort to increase the speed of the vehicle, and this continues in conjunction with the power mode signal being output to the propulsion and brake equipment 38 until the actual speed 50 goes above the brake reference velocity 16. When this happens the power and brake controller 24 provides the brake mode control signal 22 to the propulsion and brake equipment 38 and the brakes are applied in accordance with the P signal, which reduces below the 60 milliamp level, such that the speed of the vehicle decreases until the speed goes below the power reference velocity 18. When this happens the power mode output signal 22 is provided by the power and brake controller 24 and the P signal goes above the 60 milliamp level to increase the speed of the vehicle until the speed goes above the brake reference velocity 16, at which time the power and brake controller 24 again provides the brake mode output signal 22 and the P signal decreases below the 60 milliamp level such that the brakes are applied. This operation repeatedly continues as the vehicle moves along the roadway track.

The speed control apparatus of the present invention as shown in FIG. 4, provides a predetermined delay in the change from brake mode to power mode to correct the undesired control oscillation as shown in FIG. 3 between the power mode and the brake mode, and particularly in relation to the vehicle going down a negative roadway track grade. When in the brake mode, instead of changing from the brake mode back to the power mode in response to the actual speed 40 going below the power reference velocity 18, the comparator 64 is responsive to the P signal going above a predetermined value such as 73 milliamps, and the control operation stays in the brake mode until the P signal reaches this predetermined value, such as 73 milliamps, before changing to the power mode.

In the operation of the power and brake controller 24, as shown in FIG. 4, when the actual speed 40 goes above the brake reference velocity 16 a brake mode zero output signal is provided at the output 22. The PI controller 10 calculates the P signal which is proportional to the speed error SPDER 12 between the actual speed 40 and one of the reference inputs 16 and 18. For example, when in the brake mode of operation, the selector 20 chooses the brake reference VELRB at input 16, and when in the power mode of operation the selector 20 chooses the power reference velocity VELRP at input 18, and in this way the PI controller 10 requests more power for the power mode and more brake effort for the brake mode.

Figure 8:
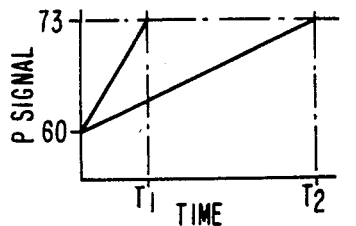
FIG. 8 shows the time delay in the P signal value before changing from brake mode to power mode of the present invention.

In FIG. 4 the functional schematic illustrates the operational hardware equivalent of the software program included in the appendix. The components in FIG. 4 that correspond with those in FIG. 1 have been indicated with the same reference numbers. A delay member 60 is responsive to the first P signal 32 and supplies a modified P control signal 62 to one input of the comparator 64 for determining a change from the brake mode to the power mode of operation. The second input 66 of the comparator 64 is provided with a predetermined reference, such as a signal corresponding to 73 milliamps. The jerk limiter 34 is chosen to have a time constant of 2 which is two times slower then the time constant of the delay member 60. As shown in FIG. 8, the input 62 will thusly have a value of 73 milliamps after the provided delay time T2 while the second P signal 35 that is supplied to the propulsion and brake equipment 38 will have a value of 73 milliamps after time T1. Thusly, in the brake mode when the delay time T2 is over and the input 62 reaches the 73 milliamps, the comparator 64 will provide an output to the power brake controller 24 that will change the output state to request a change from the brake mode to the power mode of operation.

The power mode of operation and the change from power mode to brake mode are substantially the same as was previously described in relation to the control apparatus embodiment shown in FIG. 1.

Figure 5:
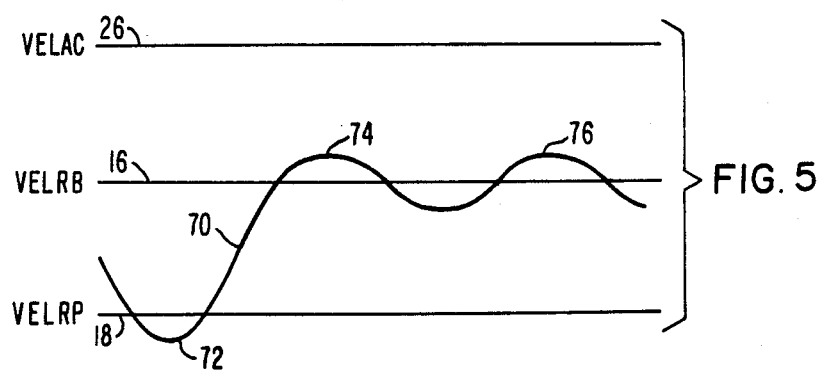
FIG. 5 is a curve illustrating the improved operational power mode to brake mode vehicle speed control of the present invention.

FIG. 5 illustrates the improved brake mode to power mode vehicle speed control of the present invention, where the vehicle speed 70 is seen to increase above the brake reference velocity 16 as shown at 74. When the vehicle speed is above the brake reference velocity 16, the brake mode is provided and the brakes are applied, such that the vehicle which can be going down a negative roadway track guide will then decrease in speed in response to the brakes. Assuming a negative grade, the vehicle will increase in speed still in the brake mode but with little or no brakes applied because the P signal responding to the small speed error between the actual speed and the brake reference velocity is requesting a modest brake effort. As the speed error increases above the brake reference velocity at 76 the brakes will again be applied in the brake mode and in response to the P signal until the speed is below the brake reference velocity 16 at which time the vehicle speed will decrease until the P signal approaches the 60 milliamp value to release the brakes at which time the speed will increase again due to the negative track grade until the speed goes above the brake reference velocity, at which time the brakes will be applied in response to a decrease in the P signal to again slow down the vehicle. But it is noted in FIG. 5 that the actual speed need not go below the power reference velocity 18, especially when the negative grade is present.

Figure 6:
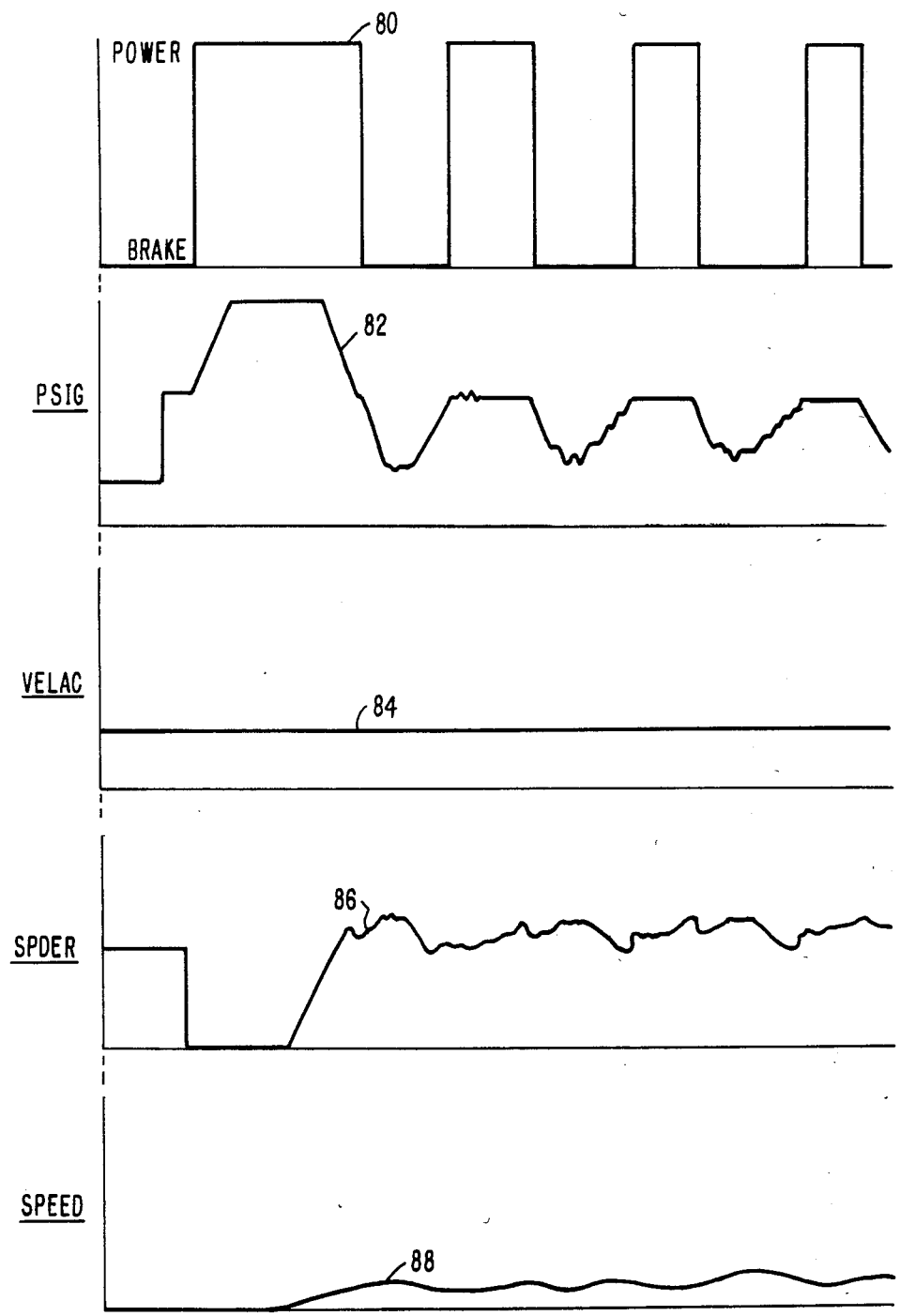
FIG. 6 is a set of curve plots to illustrate the operation of the prior art speed control apparatus.

In FIG. 6 there is shown the typical prior art speed maintaining operation, with the vehicle speed being controlled by a repetitive switching back and forth between brake mode and power mode of operation as shown by curve 80. The P signal effort request 36 to the propulsion and brake equipment 38 is shown by the curve 82. The input command speed VELAC is shown by the curve 84. The speed error SPDER signal 12 is shown by the curve 86. The vehicle actual speed 40 shown in FIG. 4 is illustrated by the curve 88.

Figure 7:
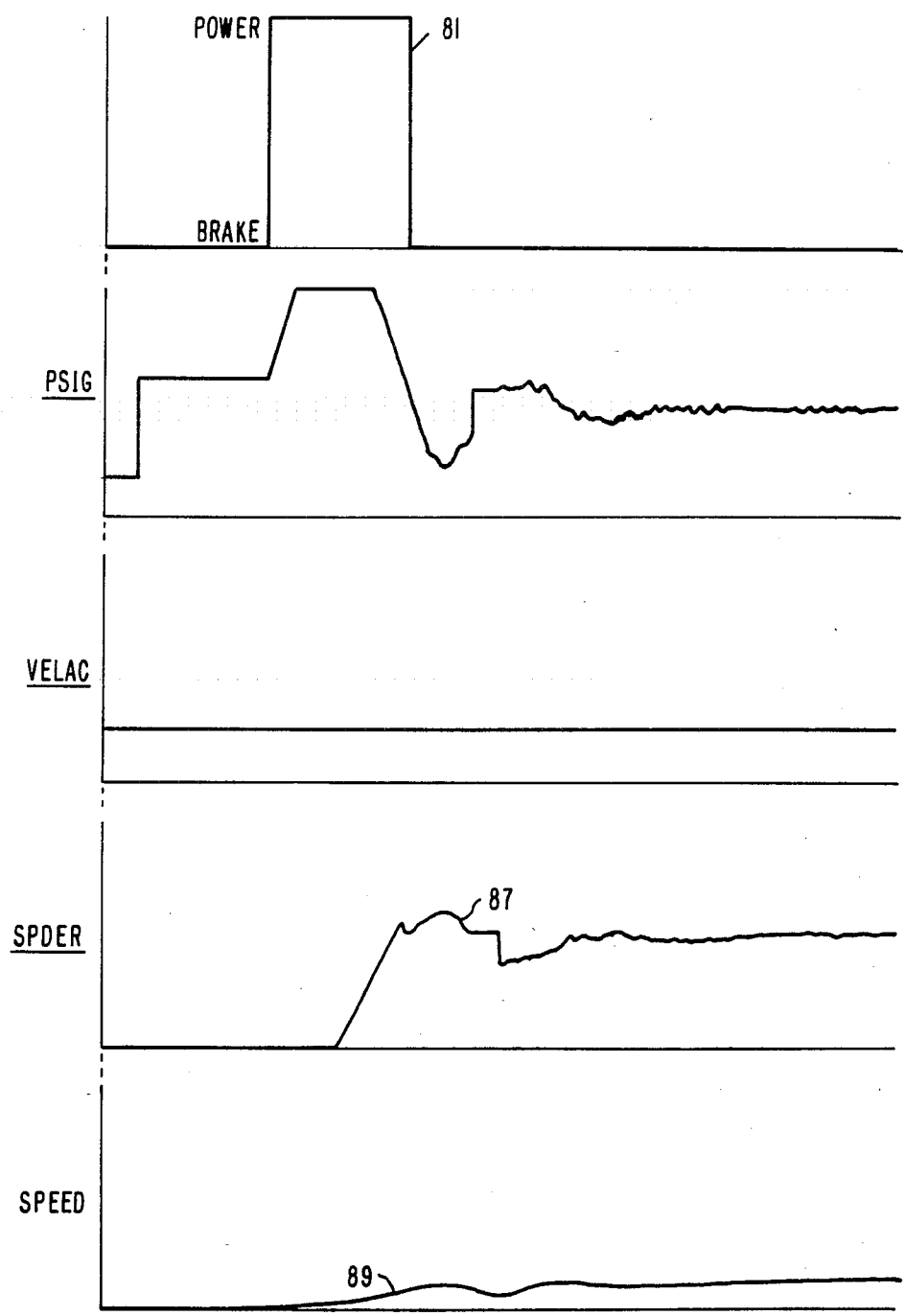
FIG. 7 is a set of curve plots to illustrate the improved operation of the present invention.

In FIG. 7 there is shown the improved speed maintaining operation of the present invention, with the transition from brake mode to power mode being delayed by an amount which is time proportional to the difference error between the reference velocity and the actual speed of the vehicle that is grade sensitive. By delaying the brake mode back to power mode transition as shown by curve 81, the speed control system stability is improved as shown by the speed error curve 87 and the vehicle speed curve 89, which are more stable for the less disturbance of the propulsion and brake equipment 38 shown in FIG. 4 over a wide range of negative grade roadway track. The example of FIG. 7 illustrates speed maintaining on a 5% downgrade track.

Figure 9:
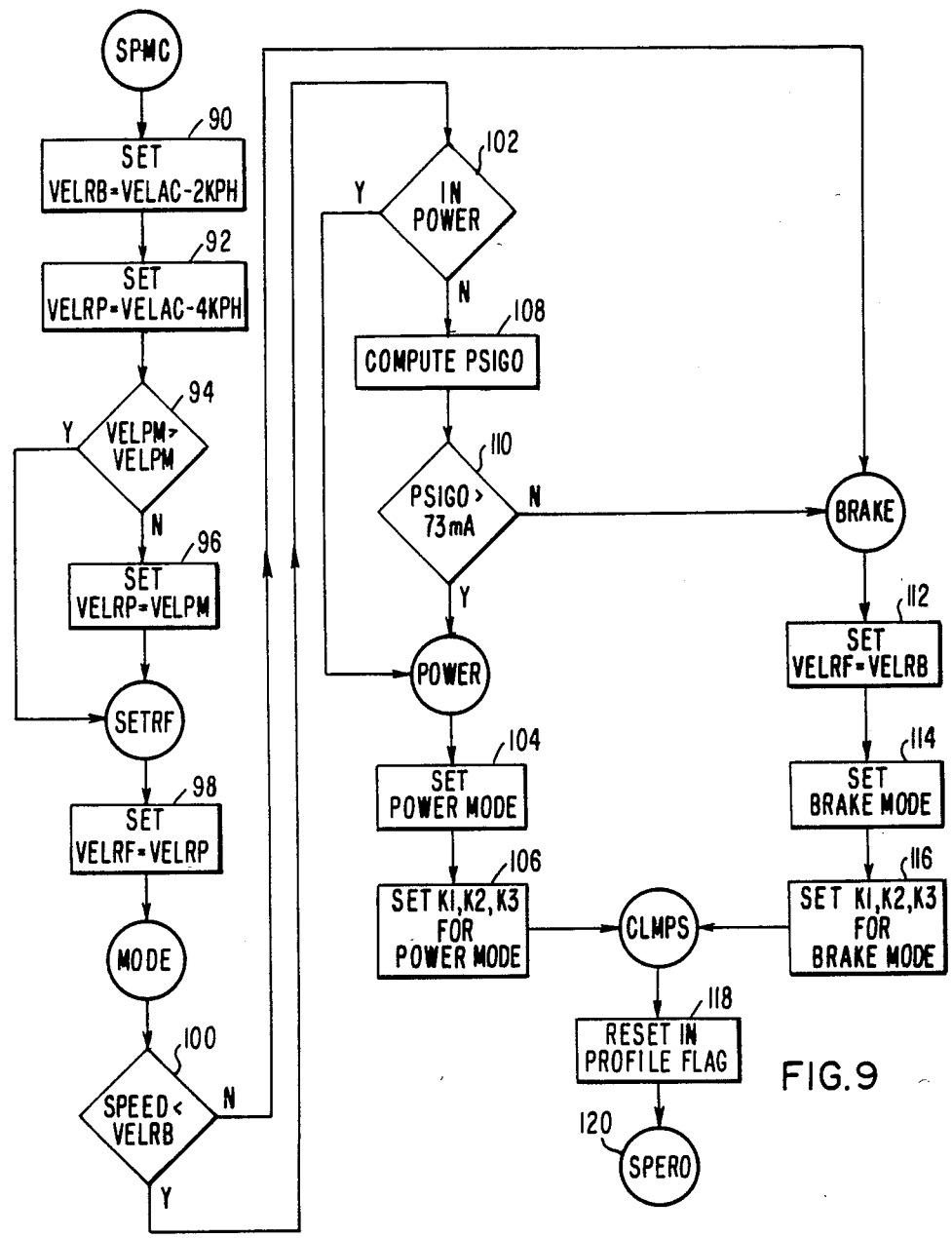
FIG. 9 is a flow chart to illustrate the speed maintaining control program of the present invention.

In FIG. 9 there is shown a flow chart of the speed maintaining constant control program, as shown in the Appendix, which is provided for the preferred embodiment of the present invention, which includes a programmed microprocessor control system. At block 90 the brake reference velocity VELRB is determined as the input command speed VELAC minus 2 KPH as shown in FIGS. 3 and 5. At block 92 the power reference velocity VELRP is determined as the input speed command or action velocity VELAC minus 4 KPH. At block 94 a check is made to see if the performance modification velocity VELPM is greater than the power reference velocity VELRP. If not, at block 96 the power reference velocity is set equal to the performance modification velocity, and if yes, the block 96 is bypassed. At block 98 the input reference velocity VELRF to the speed error comparator 14 is set equal to the power reference velocity VELRP. At block 100 a determination is made to see if the actual speed of the vehicle is less than the brake reference velocity VELRB. As shown in FIGS. 3 and 5, this determines if the vehicle speed is greater than VELRB such that the brake mode of operation is desired as required to keep the actual speed between the brake reference velocity 16 and the power reference velocity 18. If not, then the brake mode of operation is provided. And if yes, a check is made at block 102 to see if the speed maintaining operation is in the power mode. If yes, the power mode is set at block 104 and the constants K1, K2 and K3 for the PI controller 10 are set for the power mode at block 106. If not, at block 108 the delay P signal is computed to maintain the vehicle speed in the brake mode and to delay a change back to the power mode. At block 110 a check is made to see if the delay P signal is greater than 73 milliamps. If yes, a change to the power mode is provided at block 104, and if not, the operation remains in the brake mode. At block 112 to set the brake mode, the reference velocity VELRF is set equal to the brake reference velocity VELRB. At block 114 the brake mode is set, and at block 116 the constants K1, K2 and K3 for the PI controller 10 are set for the brake mode of operation. At block 118 the IN PROFILE flag is reset and the program goes to the speed error program 120, which is shown in FIG. 10.

Figure 10A:
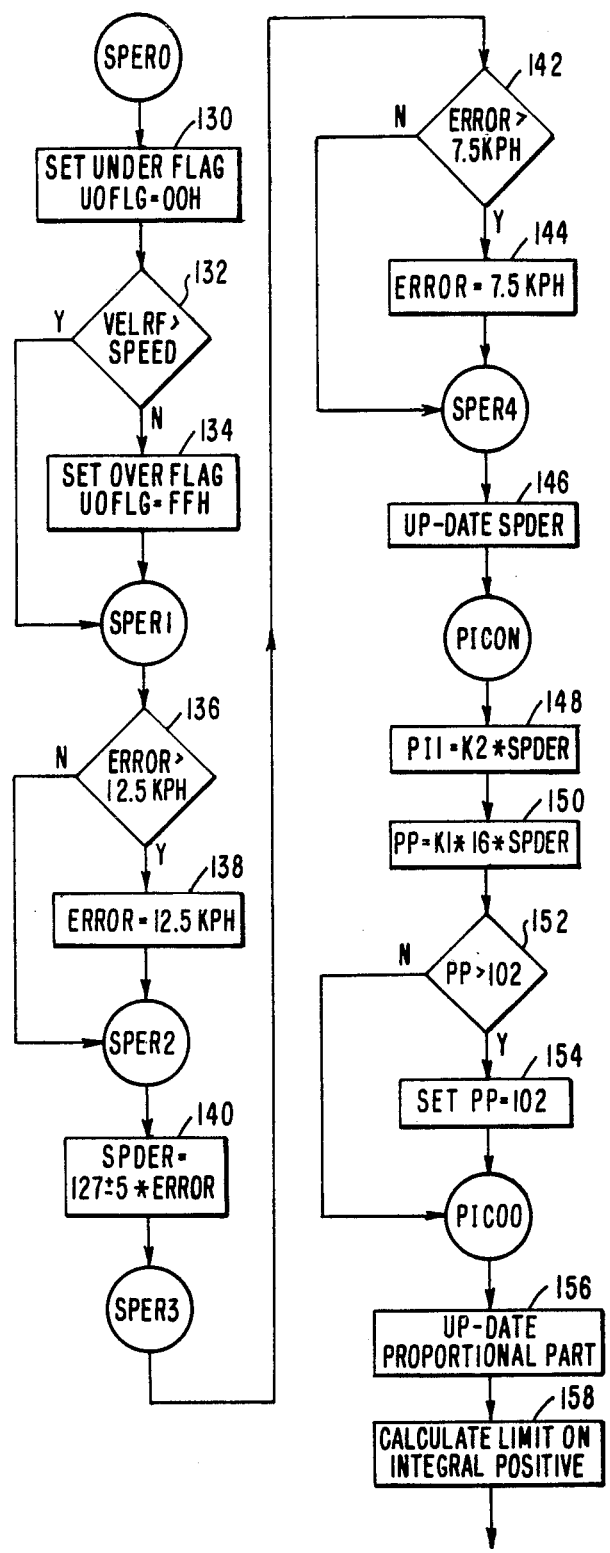
FIGS. 10A and B comprise a flowchart to illustrate the speed error determination program of the present invention.
Figure 10B:
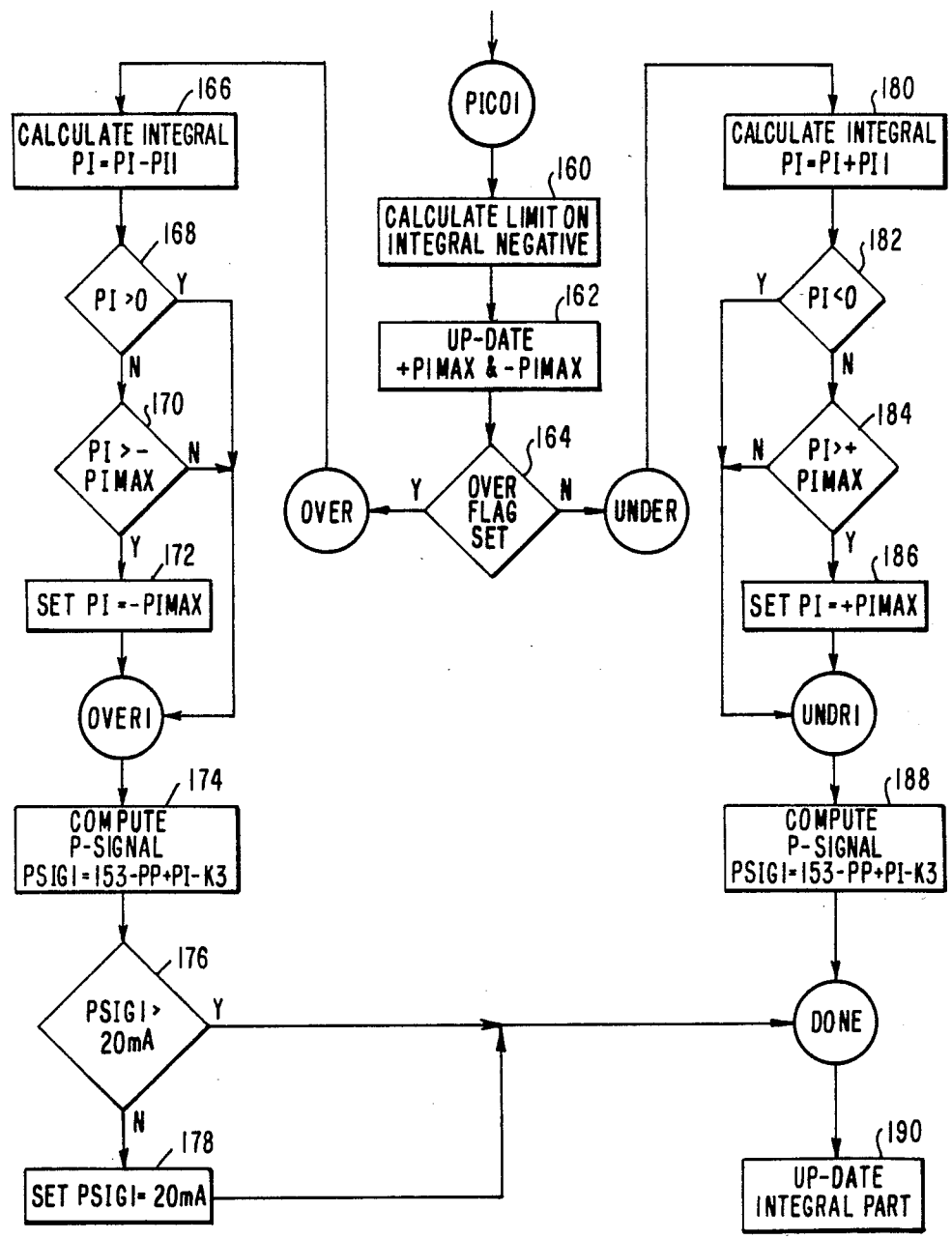

The PI controller operation is illustrated by the flow chart of the speed error program shown in FIG. 10. At block 130 the underspeed flag is reset. At block 132, the speed error which is the difference between the reference velocity VELRF and the actual speed SPEED is computed and checked for the underspeed and overspeed status. If SPEED is greater than VELRF, the overspeed flag is set on block 134. Blocks 136 to 140 provide the calculation and the scaling of the speed error to the system monitor. At block 142 a check is made to see if the error issued at block 132 is greater than 7.5 KPH. If yes, at block 144 this difference error is set equal to 7.5 KPH, and if not, the actual error is used. In block 146 the speed error SPDER used as the input of the PI controller is saved.

Beginning at block 148, the integral part of the PI controller operation is calculated. At block 148 the parameter PI1 is calculated as equal to the constant K2 times SPDER. At block 150 the proportional parameter PP is calculated as equal to the constant K1 times 16 times SPDER. At block 152 a check is made to see if the parameter PP is greater than 102. If yes, PP is set equal to 102 at block 154, and if not, at block 156 the proportional part is updated.

At block 158 there is calculated the limit on the positive integral. At block 160 the limit on the integral negative is calculated. At block 162 the +PImax and the −PImax are updated. At block 164 a check is made to see if the overspeed flag is set. If yes, at block 166 the integral parameter PI is calculated as equal to PI−PI1. At block 168 a check is made to see if PI is greater than 0. If yes, the program goes to block 174, and if not, at block 170 a check is made to see if PI is greater than the negative limit PImax. If not, the program goes to block 174, and if yes, at block 172 PI is set equal to that limit. At block 174 the output PSIG1 of the PI controller is calculated as equal to 153−PP+PI−K3. At block 176 a check is made to see if PSIG1 is greater than 20 milliamps. If yes, program operation is done, and if not, at block 178 the output PSIG1 is set equal to 20 milliamps, which is the lowest value of the P signal effort request as shown in FIG. 2.

At block 164, if the overspeed flag is not set, at block 180 the integral parameter PI is calculated as equal to PI+PI1. At block 182 a check is made to see if PI is less than 0. If yes, the program goes to block 188, and if not, at block 184 a check is made to see if PI is greater than the limit positive PImax. If no, the program goes to block 188, and if yes, at block 186 PI is set equal to this limit PImax. At block 188 the output PSIG1 is calculated as 153+PP+PI−K3. At block 190 the integral part is updated.

A program listing suitable for operation with an INTEL 8080 Microprocessor is shown in the Appendix and functions in accordance with the program flow charts shown in FIGS. 9 and 10.

```
LOC    OBJ        LINE         SOURCE STATEMENT
                  455  ;          SPEED MAINTAINING
                  456  ;REFERENCE VELOCITY AND PI CONTROLLER CONSTANTS.
                  457
0CB1  117874      458  SPMC:    LXI     D,OUT6A   ;POINT TO OUT6A.
0CB4  3A0374      459           LDA     VELAC     ;GET ACTION VELOCITY.
0CB7  D604        460           SUI     04H       ;VELRB = VELAC - 2 KPH.
0CB9  47          461           MOV     B,A       ;TEMP B = VELRB.
0CBA  D604        462           SUI     04H       ;VELRP = VELAC - 4 KPH.
0CBC  4F          463           MOV     C,A       ;TEMP C = VELRP.
0CBD  3A0074      464           LDA     VELFM
0CC0  BF          465           CMP     C         ;VELFM > VELRP ?
0CC1  D2C50C      466           JNC     SETRF     ;YES.
0CC4  4F          467           MOV     C,A       ;TEMP C = VELFM.
                  468
0CC5  79          469  SETRF:   MOV     A,C       ;GET REFERENCE VELOCITY.
0CC6  320374      470           STA     VELRF
                  471
0CC9  210474      472  MODE:    LXI     H,SPEED
0CCC  7E          473           MOV     A,M
0CCD  B8          474           CMP     B         ;SPEED < VELRB ?
0CCE  D2010D      475           JNC     BRAKE     ;NO.
0CD1  1A          476           LDAX    D         ;GET OUT6A.
0CD2  E602        477           ANI     02H       ;IN POWER ?
0CD4  C2EE0C      478           JNZ     POWER     ;YES.
0CD7  211374      479           LXI     H,PSIGC
0CDA  7E          480           MOV     A,M       ;GET CALCULATED P-SIGNAL.
0CDB  23          481           INX     H         ;POINT TO PSIGO.
0CDC  96          482           SUB     M         ;PSIGC > PSIGO ?
0CDD  D2E50C      483           JNC     JERKL     ;YES.
0CE0  86          484           ADD     M
0CE1  77          485           MOV     M,A       ;SET PSIGO = PSIGC.
0CE2  C3010D      486           JMP     BRAKE
                  487
0CE5  7E          488  JERKL:   MOV     A,M
0CE6  C602        489           ADI     02H       ;LIMIT RATE OF CHANGE BY 2.
0CE8  77          490           MOV     M,A       ;UP-DATE PSIGO.
0CE9  FE8A        491           CPI     186       ;PSIGO > 73 MA ?
0CEB  DA010D      492           JC      BRAKE     ;NO, HOLD IN BRAKE.
                  493
0CEE  F3          494  POWER:   DI                ;DISABLE INTERRUPT.
0CEF  1A          495           LDAX    D
0CF0  F602        496           ORI     02H       ;SET POWER MODE.
0CF2  12          497           STAX    D         ;UP-DATE OUT6A.
0CF3  21800A      498           LXI     H,0A80H
0CF6  221174      499           SHLD    K1        ;SET K1 = 80H, K2 = 0AH.
0CF9  3E10        500           MVI     A,10H
0CFB  321374      501           STA     K3        ;SET K3 = 10H.
0CFE  C3150D      502           JMP     CLMPS
                  503
0D01  F3          504  BRAKE:   DI                ;DISABLE INTERRUPT.
0D02  78          505           MOV     A,B       ;GET REFERENCE VELOCITY.
0D03  320374      506           STA     VELRF
0D06  1A          507           LDAX    D
0D07  E60D        508           ANI     0DH       ;SET BRAKE MODE.
0D09  12          509           STAX    D         ;UP-DATE OUT6A.
0D0A  21800A      510           LXI     H,0A80H
0D0D  221174      511           SHLD    K1        ;SET K1 = 80H, K2 = 0AH.
0D10  3E2A        512           MVI     A,2AH
0D12  321374      513           STA     K3        ;SET K3 = 2AH.
                  514
0D15  AF          515  CLMPS:   XRA     A         ;RESET IN PROFILE FLAG.
0D16  323374      516           STA     MPSF1
0D19  FB          517           EI                ;ENABLE INTERRUPT.
                  518  ;EJECT
                  519  ;          SPEED ERROR ROUTINE.
                  520
0D1A  210474      521  SPERO:   LXI     H,SPEED
0D1D  3A0374      522           LDA     VELRF
0D20  0E00        523           MVI     C,00H     ;SET UNDER FLAG.
0D22  96          524           SUB     M         ;VELRF - SPEED > 0 ?
0D23  D2290D      525           JNC     SPER1     ;YES.
0D26  0D          526           DCR     C         ;SET OVER FLAG.
0D27  2F          527           CMA
0D28  3C          528           INR     A         ;SPEED - VELRF.
                  529
0D29  FE19        530  SPER1:   CPI     25        ;SPEED ERROR > 12.5 KPH ?
0D2B  DA300D      531           JC      SPER2     ;NO.
0D2E  3E19        532           MVI     A,25
                  533
0D30  5F          534  SPER2:   MOV     E,A       ;TEMP E = SPEED ERROR.
0D31  47          535           MOV     B,A       ;TEMP B = SPEED ERROR.
0D32  79          536           MOV     A,C
0D33  323074      537           STA     UOFLG     ;SET UNDER/OVER FLAG.
0D36  AF          538           XRA     A         ;RESET CARRY BIT.
0D37  78          539           MOV     A,B
0D38  17          540           RAL
0D39  17          541           RAL
0D3A  80          542           ADD     B
0D3B  47          543           MOV     B,A       ;ERROR = 5*SPEED ERROR.
```

| LOC | OBJ | LINE | | SOURCE STATEMENT | | |
|---|---|---|---|---|---|---|
| 0D3C | 3E7F | 544 | | MVI | A,127 | ;SET BIAS. |
| 0D3E | 80 | 545 | | ADD | B | ;SPERD = 127 + ERROR. |
| 0D3F | 0C | 546 | | INR | C | ;OVER FLAG SET ? |
| 0D40 | CA450D | 547 | | JZ | SPER3 | ;YES. |
| 0D43 | 90 | 548 | | SUB | B | |
| 0D44 | 90 | 549 | | SUB | B | ;SPERD = 127 - ERROR. |
| | | 550 | | | | |
| 0D45 | 320874 | 551 | SPER3: | STA | SPERB | ;UP-DATE SPEED ERROR TO DISPLAY. |
| 0D48 | 7B | 552 | | MOV | A,E | ;GET SPEED ERROR. |
| 0D49 | FE0F | 553 | | CPI | 15 | ;SPDER > 7.5 KPH ? |
| 0D4B | DA500D | 554 | | JC | SPER4 | ;NO. |
| 0D4E | 3E0F | 555 | | MVI | A,15 | ;SET SPDER = 7.5 KPH. |
| | | 556 | | | | |
| 0D50 | 320774 | 557 | SPER4: | STA | SPDER | ;UP-DATE PI CONTROLLER SPEED ERROR. |
| 0D53 | 5F | 558 | | MOV | E,A | ;TEMP E = SPDER. |
| 0D54 | B7 | 559 | | ORA | A | ;RESET CARRY BIT. |
| 0D55 | 17 | 560 | | RAL | | |
| 0D56 | 17 | 561 | | RAL | | |
| 0D57 | 17 | 562 | | RAL | | |
| 0D58 | 17 | 563 | | RAL | | |
| 0D59 | 47 | 564 | | MOV | B,A | ;TEMP B = 16*SPDER. |
| | | 565 | | | | |
| | | 566 | $EJECT | | | |
| | | 567 | ; | PROPORTIONAL/INTEGRAL CONTROLLER ROUTINE. | | |
| | | 568 | | | | |
| 0D5A | 3A1274 | 569 | PICON: | LDA | K2 | |
| 0D5D | CDC30E | 570 | | CALL | MULT | ;PI1 = K2*SPDER. |
| 0D60 | 221674 | 571 | | SHLD | PI1 | |
| 0D63 | E5 | 572 | | PUSH | H | ;SAVE PI1. |
| 0D64 | 58 | 573 | | MOV | E,B | ;TEMP E = 16*SPDER. |
| 0D65 | 3A1174 | 574 | | LDA | K1 | |
| 0D68 | CDC30E | 575 | | CALL | MULT | ;PP = K1*16*SPDER. |
| 0D6B | 3A1374 | 576 | | LDA | K3 | |
| 0D6E | 4F | 577 | | MOV | C,A | ;TEMP C = K3. |
| 0D6F | 3E66 | 578 | | MVI | A,102 | |
| 0D71 | BC | 579 | | CMP | H | ;PP > 102 ? |
| 0D72 | DA740D | 580 | | JC | PIC00 | ;YES, SET PP = 102. |
| 0D75 | 7C | 581 | | MOV | A,H | |
| | | 582 | | | | |
| 0D76 | 321874 | 583 | PIC00: | STA | PP | ;UP-DATE PROPORTIONAL PART. |
| 0D79 | 47 | 584 | | MOV | B,A | ;TEMP B = PP. |
| 0D7A | 3E66 | 585 | | MVI | A,102 | |
| 0D7C | 90 | 586 | | SUB | B | ;PINOM = 102 - PP. |
| 0D7D | 81 | 587 | | ADD | C | ;PIMAX = 102 - PP + K3. |
| 0D7E | 6F | 588 | | MOV | L,A | ;TEMP L = +PIMAX. |
| 0D7F | 91 | 589 | | SUB | C | ;PINOM = 102 - PP. |
| 0D80 | 91 | 590 | | SUB | C | ;PINOM - K3 > 0 ? |
| 0D81 | D2850D | 591 | | JNC | PIC01 | ;YES. |
| 0D84 | AF | 592 | | XRA | A | |
| | | 593 | | | | |
| 0D85 | 3D | 594 | PIC01: | DCR | A | |
| 0D86 | 2F | 595 | | CMA | | |
| 0D87 | 67 | 596 | | MOV | H,A | ;TEMP H = -PIMAX. |
| 0D88 | 221974 | 597 | | SHLD | PIMAX | ;UP-DATE +PIMAX & -PIMAX. |
| 0D8B | 3A3074 | 598 | | LDA | UOFLG | |
| 0D8E | B7 | 599 | | ORA | A | ;OVERSPEED FLAG SET ? |
| 0D8F | C2AC0D | 600 | | JNZ | OVER | ;YES. |
| | | 601 | | | | |
| 0D92 | 45 | 602 | UNDER: | MOV | B,L | ;TEMP B = +PIMAX. |
| 0D93 | 2A1474 | 603 | | LHLD | PI | |
| 0D96 | D1 | 604 | | POP | D | ;RESTORE PI1. |
| 0D97 | 19 | 605 | | DAD | D | ;PI = PI + PI1. |
| 0D98 | 7C | 606 | | MOV | A,H | |
| 0D99 | B7 | 607 | | ORA | A | ;PI NEGATIVE ? |
| 0D9A | FAA20D | 608 | | JM | UNDR1 | ;YES. |
| 0D9D | B8 | 609 | | CMP | B | ;PI > PIMAX ? |
| 0D9E | DAA20D | 610 | | JC | UNDR1 | ;NO, PIMAX NOT USED. |
| 0DA1 | 60 | 611 | | MOV | H,B | ;PI = PI MAX. |
| | | 612 | | | | |
| 0DA2 | 3A1874 | 613 | UNDR1: | LDA | PP | ;CALCULATE PSIG. |
| 0DA5 | C699 | 614 | | ADI | 153 | ;153+PP |
| 0DA7 | 84 | 615 | | ADD | H | ;153+PP+PI. |
| 0DA8 | 91 | 616 | | SUB | C | ;PSIGC = 153+PP+PI-K3. |
| 0DA9 | C3CF0D | 617 | | JMP | DONE | |
| | | 618 | | | | |
| 0DAC | 44 | 619 | OVER: | MOV | B,H | ;TEMP B = -PIMAX. |
| 0DAD | 2A1474 | 620 | | LHLD | PI | |
| 0DB0 | D1 | 621 | | POP | D | ;RESTORE PI1. |
| 0DB1 | 7D | 622 | | MOV | A,L | ;PI = PI - PI1. |
| 0DB2 | 93 | 623 | | SUB | E | |
| 0DB3 | 6F | 624 | | MOV | L,A | |
| 0DB4 | 7C | 625 | | MOV | A,H | |
| 0DB5 | 9A | 626 | | SBB | D | |
| 0DB6 | 67 | 627 | | MOV | H,A | ;PI POSITIVE ? |
| 0DB7 | F2BF0D | 628 | | JP | OVER1 | ;YES. |
| 0DBA | B8 | 629 | | CMP | B | ;-PI > -PIMAX ?. |
| 0DBB | D2BF0D | 630 | | JNC | OVER1 | ;YES, -PIMAX NOT USED. |

```
LOC    OBJ      LINE          SOURCE STATEMENT

0DBE   40       631           MOV      H,B         ;SET PI = -PIMAX.
                632
0DBF   3A1874   633  OVER1:   LDA      PP          ;CALCULATE PSIGC.
0DC2   47       634           MOV      B,A
0DC3   3E99     635           MVI      A,153
0DC5   91       636           SUB      C           ;153-K3.
0DC6   84       637           ADD      H           ;153-K3+PI.
0DC7   90       638           SUB      B           ;PSIGC = 153-PP+PI-K3.
0DC8   FE33     639           CPI      51          ;PSIGC > 20 MA ?
0DCA   D2CF0D   640           JNC      DONE        ;YES.
0DCD   3E33     641           MVI      A,51        ;SET PSIGC = 20 MA.
                642
0DCF   221474   643  DONE:    SHLD     PI          ;UP-DATE INTEGRAL PART.
0DD2   47       644           MOV      B,A         ;TEMP B = PSIG1.
0DD3   321874   645           STA      PSIGC       ;UP-DATE CALCULATED P-SIGNAL.
                646
                647  $EJECT
                648  ;        PERFORMANCE MODIFICATION CONTROL ROUTINE.
                649
0DD6   213374   650  PMCON:   LXI      H,MPSF1
0DD9   117874   651           LXI      D,OUT6A
0DDC   7E       652           MOV      A,M         ;GET MPSF1.
0DDD   B7       653           ORA      A           ;IN PROGRAM STOP ?
0DDE   C2F00D   654           JNZ      BRMOD       ;YES.
0DE1   1A       655           LDAX     D           ;GET OUT6A.
0DE2   E602     656           ANI      02H         ;IN POWER ?
0DE4   CA110E   657           JZ       BRK1        ;NO.
0DE7   3E99     658           MVI      A,153
0DE9   B8       659           CMP      B           ;PSIG1 > 60 MA ?
0DEA   D2170E   660           JNC      COAST       ;NO.
0DED   C3210E   661           JMP      PWMOD
                662
0DF0   F3       663  BRMOD:   DI                   ;DISABLE INTERRUPT.
0DF1   1A       664           LDAX     D           ;GET OUT6A
0DF2   E60D     665           ANI      0DH         ;SET BRAKE MODE.
0DF4   12       666           STAX     D           ;UP-DATE OUT6A.
0DF5   7E       667           MOV      A,M         ;GET MPSF1 FLAGS.
0DF6   17       668           RAL                  ;IN PROFILE ?
0DF7   DA110E   669           JC       BRK1        ;YES.
0DFA   3A0174   670           LDA      MVLPS
0DFD   4F       671           MOV      C,A         ;TEMP C = MVLPS.
0DFE   3A0474   672           LDA      SPEED
0E01   B9       673           CMP      C           ;MVLPS > SPEED ?
0E02   DA070E   674           JC       BRK0        ;YES.
0E05   36AA     675           MVI      M,0AAH      ;SET IN PROFILE FLAG.
                676
0E07   3E7F     677  BRK0:    MVI      A,127
0E09   B8       678           CMP      B           ;PSIG1 > 50 MA ?
0E0A   D2630E   679           JNC      JERK        ;NO.
0E0D   47       680           MOV      B,A         ;SET PSIG1 = 50 MA.
0E0E   C3630E   681           JMP      JERK
                682
0E11   3E99     683  BRK1:    MVI      A,153
0E13   B8       684           CMP      B           ;PSIG1 > 60 MA ?
0E14   D2630E   685           JNC      JERK        ;NO.
                686
0E17   47       687  COAST:   MOV      B,A         ;TEMP B = PSIG1 = 60 MA.
0E18   210000   688           LXI      H,00H       ;RESET PI CONTROLLER.
0E1B   221474   689           SHLD     PI
0E1E   C3630E   690           JMP      JERK
                691
0E21   3A0D74   692  PWMOD:   LDA      TSTAT       ;GET TRAIN STATUS.
0E24   1F       693           RAR                  ;RESTRICTION MODE APPLIED ?
0E25   D2460E   694           JNC      PM50        ;YES.
0E28   3A5874   695           LDA      PMDAT
0E2B   E6C0     696           ANI      0C0H        ;MASK FOR PM LEVEL.
0E2D   FEC0     697           CPI      0C0H        ;POWER LIMIT ?
0E2F   CA500E   698           JZ       PWRLM       ;YES.
                699
0E32   FE80     700  PM100:   CPI      80H         ;PM 100% ?
0E34   CA630E   701           JZ       JERK        ;YES.
0E37   FE40     702           CPI      40H         ;PM 63% ?
0E39   C2460E   703           JNZ      PM50        ;NO.
                704
0E3C   3EDE     705  PM63:    MVI      A,222
0E3E   B8       706           CMP      B           ;PSIG1 > 87 MA ?
0E3F   D2630E   707           JNC      JERK        ;NO.
0E42   47       708           MOV      B,A         ;SET PSIG1 = 87 MA.
0E43   C3610E   709           JMP      PWR1
                710
0E46   3ED2     711  PM50:    MVI      A,210
0E48   B8       712           CMP      B           ;PSIG1 > 82 MA ?
0E49   D2630E   713           JNC      JERK        ;NO.
0E4C   47       714           MOV      B,A         ;SET PSIG1 = 82 MA.
0E4D   C3610E   715           JMP      PWR1
                716
0E50   3A0474   717  PWRLM:   LDA      VEL1        ;GET SPEED IN KPH.
0E53   1F       718           RAR
0E54   E63F     719           ANI      3FH         ;0.25*SPEED.
```

```
LOC   OBJ        LINE        SOURCE STATEMENT

0E56 21001D      720         LXI    H,PLTBL     ;POINT TO PURLM TABLE.
0E59 85          721         ADD    L           ;ADD SPEED OFFSET.
0E5A 6F          722         MOV    L,A         ;SET POINTER.
0E5B 7E          723         MOV    A,M
0E5C B8          724         CMP    B           ;PSIG1 > PSIG POWER LIMIT ?
0E5D D2630E      725         JNC    JERK        ;NO.
0E60 47          726         MOV    B,A         ;SET PSIG1 = PSIG PURLM.
                 727
0E61 3A1574      728 PWR1:   LDA    PI+1
0E64 3D          729         DCR    A           ;PI - 1 < 0 ?
0E65 FA630E      730         JM     JERK        ;YES.
0E68 321574      731         STA    PI+1
                 732
                 733 $EJECT
                 734 ;       JERK LIMITER ROUTINE.
                 735
0E6B F3          736 JERK:   DI                 ;DISABLE INTERRUPT.
0E6C 211D74      737         LXI    H,PSIG1
0E6F 70          738         MOV    M,B         ;UP-DATE DESIRED P-SIGNAL.
0E70 78          739         MOV    A,B
0E71 23          740         INX    H           ;POINT TO PSIG.
0E72 96          741         SUB    M           ;PSIG1 < PSIG ?
0E73 DA810E      742         JC     JERK2       ;YES.
0E76 FE03        743         CPI    03H         ;DIFF > 3 ?
0E78 DA7D0E      744         JC     JERK1       ;NO.
0E7B 3E03        745         MVI    A,03H       ;SET DIFF = 3.
                 746
0E7D 86          747 JERK1:  ADD    M           ;PSIG = PSIG + DIFF.
0E7E C38D0E      748         JMP    JERK4
                 749
0E81 2F          750 JERK2:  CMA                ;PSIG1 < PSIG.
0E82 3C          751         INR    A
0E83 FE03        752         CPI    03H         ;DIFF > 3 ?
0E85 DA8A0E      753         JC     JERK3       ;NO.
0E88 3E03        754         MVI    A,03H       ;SET DIFF = 3.
                 755
0E8A 4F          756 JERK3:  MOV    C,A
0E8B 7E          757         MOV    A,M
0E8C 91          758         SUB    C           ;PSIG = PSIG - DIFF.
                 759
0E8D D364        760 JERK4:  OUT    64H         ;OUTPUT PSIG.
0E8F 327574      761         STA    OUT64
0E92 77          762         MOV    M,A         ;UP-DATE PSIG.
0E93 3A7574      763         LDA    OUT6A
0E96 D36A        764         OUT    6AH         ;OUTPUT MODE.
0E98 E602        765         ANI    02H         ;POWER MODE SET ?
0E9A CA9F0E      766         JZ     EXIT        ;NO.
0E9D 3EFF        767         MVI    A,0FFH      ;SET POWER MODE STATUS.
                 768
0E9F 321F74      769 EXIT:   STA    PBRKS       ;UP-DATE POWER/BRAKE STATUS.
0EA2 E604        770         ANI    04H
0EA4 47          771         MOV    B,A
0EA5 3A5175      772         LDA    SL50T+1
0EA8 E6FB        773         ANI    0FBH        ;RESET FORMER BRAKE STATUS.
0EAA B0          774         ORA    B           ;UP-DATE STAT 'F'.
0EAB 325175      775         STA    SL50T+1
0EAE 3A7074      776         LDA    OUT08
0EB1 2F          777         CMA                ;COMPLEMENT DATA.
0EB2 D308        778         OUT    08H         ;CONSOLE LIGHT.
0EB4 AF          779         XRA    A           ;SET CHECK OUT FLAG.
0EB5 321074      780         STA    CICOS
                 781
0EB8 113F74      782 EXIT1:  LXI    D,TRACE     ;POINT TO TRACE STATUS.
0EBB C1          783         POP    B           ;RESTORE TRACE FLAG.
0EBC 1A          784         LDAX   D
0EBD A8          785         XRA    B           ;RESET TRACE FLAG.
0EBE 12          786         STAX   D
0EBF CD1505      787         CALL   MODE7       ;TURN TRACE DISPLAY 'OFF'.
0EC2 F1          788         POP    PSW         ;RESTORE WORKING REGISTERS.
0EC3 C1          789         POP    B
0EC4 D1          790         POP    D
0EC5 E1          791         POP    H
0EC6 FB          792         EI                 ;ENABLE INTERRUPT.
0EC7 C9          793         RET
                 794
                 795
                 796 ;       MULTIPLY SUBROUTINE.
                 797
                 798 ;       H,L = A * E
                 799 ;       ALL REGISTERS USED.
                 800
0EC8 210000      801 MULT:   LXI    H,00H
0ECB 1600        802         MVI    D,00H
0ECD 0E08        803         MVI    C,08H       ;SET BIT COUNTER.
                 804
0ECF 1F          805 MULT1:  RAR                ;LSB OF MULTIPLIER = 0 ?
0ED0 D2D40E      806         JNC    MULT2       ;YES.
```

```
LOC  OBJ      LINE       SOURCE STATEMENT

0ED3 1F       807          DAD    D
              808
0ED4 EB       809 MULT2:   XCHG
0ED5 29       810          DAD    H    ;SHIFT LEFT ONE BIT.
0ED6 EB       811          XCHG
0ED7 0D       812          DCR    C    ;DONE ?
0ED8 C2CF0E   813          JNZ    MULT1 ;NO.
0EDB C9       814          RET
              815 ;EJECT
```

I claim:

1. In apparatus for controlling the velocity of a passenger vehicle moving along a track having a desired command speed, the combination of:

means responsive to the command speed for providing a brake reference velocity, means responsive to the command speed for providing a power reference velocity, means responsive to the vehicle movement for providing an actual velocity feedback, means responsive to the brake reference velocity, the power reference velocity and the actual velocity feedback to provide an output control signal to determine one of a power mode and a brake mode, means responsive to said output control signal for providing a velocity reference in accordance with one of the brake reference velocity and the power reference velocity, means responsive to the velocity reference and the actual velocity feedback for providing a velocity error signal, means providing an effort control signal having a magnitude for determining the vehicle effort in relation to moving along the track, and control means responsive to the effort control signal and operative with the output control signal providing means for determining the provision of said output control signal in response to the effort control signal.

2. The velocity control apparatus of claim 1, with the control means determining the provision of the power mode control signal.

3. The velocity control apparatus of claim 1, with the power mode control signal being provided when the effort control signal has a predetermined magnitude.

4. The velocity control apparatus of claim 1, including said control means providing a delayed signal having a magnitude determined by the magnitude of the effort control signal, and means coupled with the output control signal providing means and responsive to the delayed signal for determining the provision of the power mode control signal.

5. The velocity control apparatus of claim 4, with the power mode control signal provision determining means being operative to compare the delayed signal with a predetermined magnitude of the effort control signal for providing the power mode control signal.

6. In a method of controlling the velocity of a vehicle having a propulsion and brake equipment and moving along a track in response to a desired command speed, said vehicle being operative in one of a power mode and a brake mode, the steps of providing a first reference velocity for the brake mode and a second reference velocity for the power mode in response to the command speed, providing a feedback velocity in accordance with the actual velocity of the vehicle, determining the operative mode of the vehicle in one of said power mode and said brake mode in accordance with a comparison of the feedback velocity with said first and second reference velocities, providing an effort control signal to the propulsion and brake equipment in accordance with a comparison of the feedback velocity and one of the first reference velocity and the second reference velocity as determined by the operative mode of the vehicle, and modifying said operative mode determination from said one to the other of the power and brake modes in response to the magnitude of said effort control signal.

7. The velocity controlling method of claim 6, including the step of providing a modified effort control signal having a magnitude established by a predetermined time delay characteristic in relation to the magnitude of said effort control signal, and modifying said operative mode determination in response to the modified effort control signal.

8. The velocity controlling method of claim 6, with said effort control signal being provided in accordance with the error difference of the feedback velocity in relation to said one reference velocity.

9. The velocity controlling method of claim 6, with said modifying of the operative mode determination resulting in a delay in the change from the brake mode to the power mode for reducing the number of said changes when the vehicle is moving along a track having a negative grade.

10. The velocity controlling method of claim 6, with said modifying of the operative mode determination being operative to reduce the changes from one to the other of the power mode and the brake mode.

* * * * *